US012673592B2

(12) United States Patent
Warner et al.

(10) Patent No.: US 12,673,592 B2
(45) Date of Patent: Jul. 7, 2026

(54) SYSTEMS AND METHODS FOR LIMITING REARWARD MOTION OF A SEATBACK IN A REAR-IMPACT COLLISION

(71) Applicant: Brigham Young University, Provo, UT (US)

(72) Inventors: Mark Warner, Provo, UT (US); Wyatt Warner, Provo, UT (US)

(73) Assignee: Brigham Young University, Provo, UT (US)

(*) Notice: Subject to any disclaimer, the term of this patent is extended or adjusted under 35 U.S.C. 154(b) by 178 days.

(21) Appl. No.: 18/559,626

(22) PCT Filed: Jun. 3, 2022

(86) PCT No.: PCT/US2022/032181
§ 371 (c)(1),
(2) Date: Nov. 8, 2023

(87) PCT Pub. No.: WO2022/260956
PCT Pub. Date: Dec. 15, 2022

(65) Prior Publication Data
US 2024/0227641 A1     Jul. 11, 2024

Related U.S. Application Data

(60) Provisional application No. 63/209,124, filed on Jun. 10, 2021.

(51) Int. Cl.
*B60N 2/427*        (2006.01)
*B60N 2/00*         (2006.01)

(52) U.S. Cl.
CPC ......... *B60N 2/4279* (2013.01); *B60N 2/0025* (2023.08); *B60N 2/42709* (2013.01); *B60N 2/42745* (2013.01)

(58) Field of Classification Search
CPC .............. B60N 2/4279; B60N 2/42736; B60N 2/42745; B60N 2/0025; B60N 2/42709
See application file for complete search history.

(56) References Cited

U.S. PATENT DOCUMENTS 5,722,722 A * 3/1998 Massara ............. B60N 2/42745
297/216.13
6,474,734 B1 11/2002 Masuda et al.
(Continued)

FOREIGN PATENT DOCUMENTS

DE      102005061654 A1    6/2007
JP          2000280805 A    10/2000
(Continued)

OTHER PUBLICATIONS

International Search Report and Written Opinion from International Application No. PCT/US2022032181 mailed Nov. 3, 2022.
(Continued)

*Primary Examiner* — Milton Nelson, Jr.
(74) *Attorney, Agent, or Firm* — Ballard Spahr LLP

(57) ABSTRACT

Embodiments disclosed are vehicle seat systems for restricting yielding or deflection of a seatback in a rear-impact collision, and related methods. In an embodiment, a vehicle seat system includes a vehicle seat and a seatback deformation limiting system. The vehicle seat includes a seat bottom frame and a seatback frame secured to the seat bottom. The seatback deformation limiting system includes a frame assembly and a computer system. The frame assembly is configured to selectively allow the seatback frame to yield and also selectively limit or inhibit the seatback frame from yielding. The computer system is configured to detect a rear-impact collision in a vehicle, wherein the frame assembly is operably coupled to the computer system and, responsive to the computer system detecting the rear-impact collision in the vehicle, configured to limit or inhibit the
(Continued)

seatback frame from yielding towards a rearward seat in the vehicle directly behind the vehicle seat.

13 Claims, 9 Drawing Sheets

(56)                    References Cited

U.S. PATENT DOCUMENTS

2003/0107232 A1      6/2003   Demptos et al.
2008/0100104 A1      5/2008   Axelsson et al.
2017/0355288 A1     12/2017   Barbat et al.

FOREIGN PATENT DOCUMENTS

KR        20050063849  A  *   6/2005
KR          100535094  B1    12/2005
WO          2013065669 A1     5/2013

OTHER PUBLICATIONS

U.S. Appl. No. 63/209,124, filed Jun. 10, 2021.

* cited by examiner

200

210

205

250

240b

230

225

205

235        245        220

240a

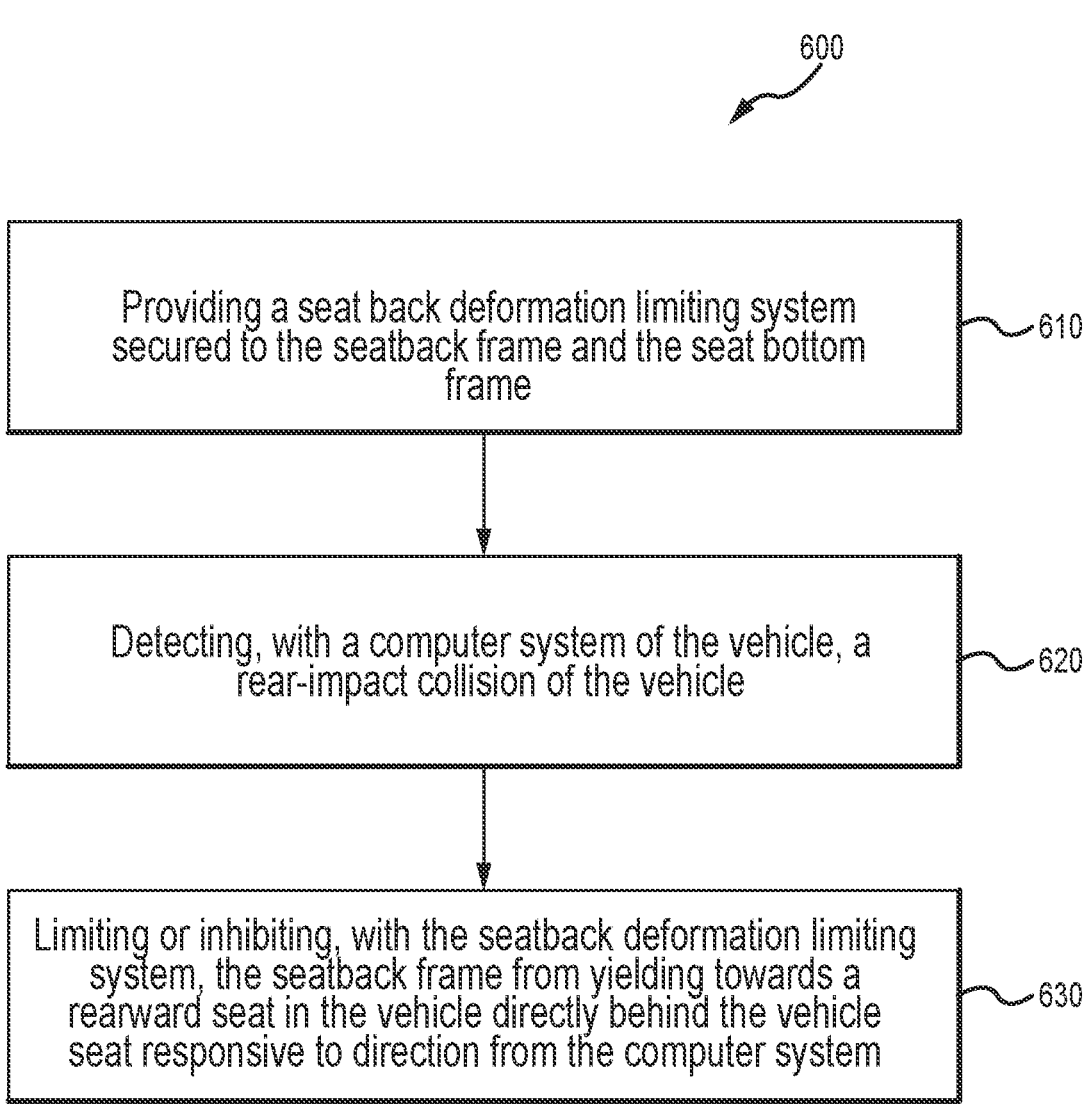

600

Providing a seat back deformation limiting system secured to the seatback frame and the seat bottom frame ⌇⁓610

Detecting, with a computer system of the vehicle, a rear-impact collision of the vehicle ⌇⁓620

Limiting or inhibiting, with the seatback deformation limiting system, the seatback frame from yielding towards a rearward seat in the vehicle directly behind the vehicle seat responsive to direction from the computer system ⌇⁓630

FIG.6

SYSTEMS AND METHODS FOR LIMITING REARWARD MOTION OF A SEATBACK IN A REAR-IMPACT COLLISION

CROSS-REFERENCE TO RELATED APPLICATIONS

This application is a U.S. Nationalization of PCT International Application No. PCT/US2022/032181 filed Jun. 3, 2022, which claims priority to U.S. Provisional Patent Application No. 63/209,124 filed on Jun. 10, 2021, the disclosure of which is incorporated herein, in its entirety, by this reference.

BACKGROUND

In conventional vehicle systems, when a vehicle is involved in a rear-impact collision, a front seat in the vehicle can deform over the duration of the rear-impact crash pulse to absorb energy and protect the front occupant in the front seat. If, however, there is another, rear occupant in the vehicle sitting directly behind the front seat, the deformation of the front seat during the rear-impact crash can interfere with the cabin space of the rear occupant and, in some cases, cause injury to the rear occupant.

SUMMARY

Embodiments disclosed herein are systems and methods for restricting rearward motion of a seatback in a rear-impact collision. In an embodiment, a vehicle seat system including a vehicle seat and seatback deformation limiting system is described. The vehicle seat includes a seat bottom frame and a seatback frame secured to the seat bottom frame. The seatback deformation limiting system includes a frame assembly configured to selectively allow the seatback frame to pivot and also selectively limit or inhibit the seatback frame from yielding. The seatback deformation limiting system includes a computer system include one or more sensors configured to detect a rear-impact collision in a vehicle. The frame assembly is operably coupled to the computer system and, responsive to the computer system detecting the rear-impact collision in the vehicle, configured to limit or inhibit the seatback frame from yielding towards a rearward seat in the vehicle directly behind the vehicle seat.

In an embodiment, a seatback deformation limiting system for a vehicle seat including a seat bottom frame and a seatback frame secured to the seat bottom frame is described. The system includes a detent structure having a first region securable to the seat bottom frame and a second region securable to the seatback frame, the first region and a second region defining a slot therebetween. The system includes an insert sized and dimensioned to fit at least partially within the slot between the first region and the second region of the detent structure. The system includes an actuator secured to the insert and configured to selectively deploy the insert at least partially into the slot.

In an embodiment, a method of limiting a seatback frame from yielding rearward in a rear-impact collision of a vehicle is described. The method includes providing a seat back restriction system secured to the seatback frame and a seat bottom frame. The method also includes detecting, with one or more sensors of a computer system of the vehicle, a rear-impact collision of the vehicle. The method also includes limiting or inhibiting, with the seatback deformation limiting system, the seatback frame from yielding towards a rearward seat in the vehicle directly behind the vehicle seat responsive to direction from the computer system when the one or more sensors detect the rear-impact collision.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

FIG. 6 is a flow diagram of a method for limiting rearward deflection of a seatback in a rear-impact collision, according to an embodiment.

DETAILED DESCRIPTION

Figure 1:
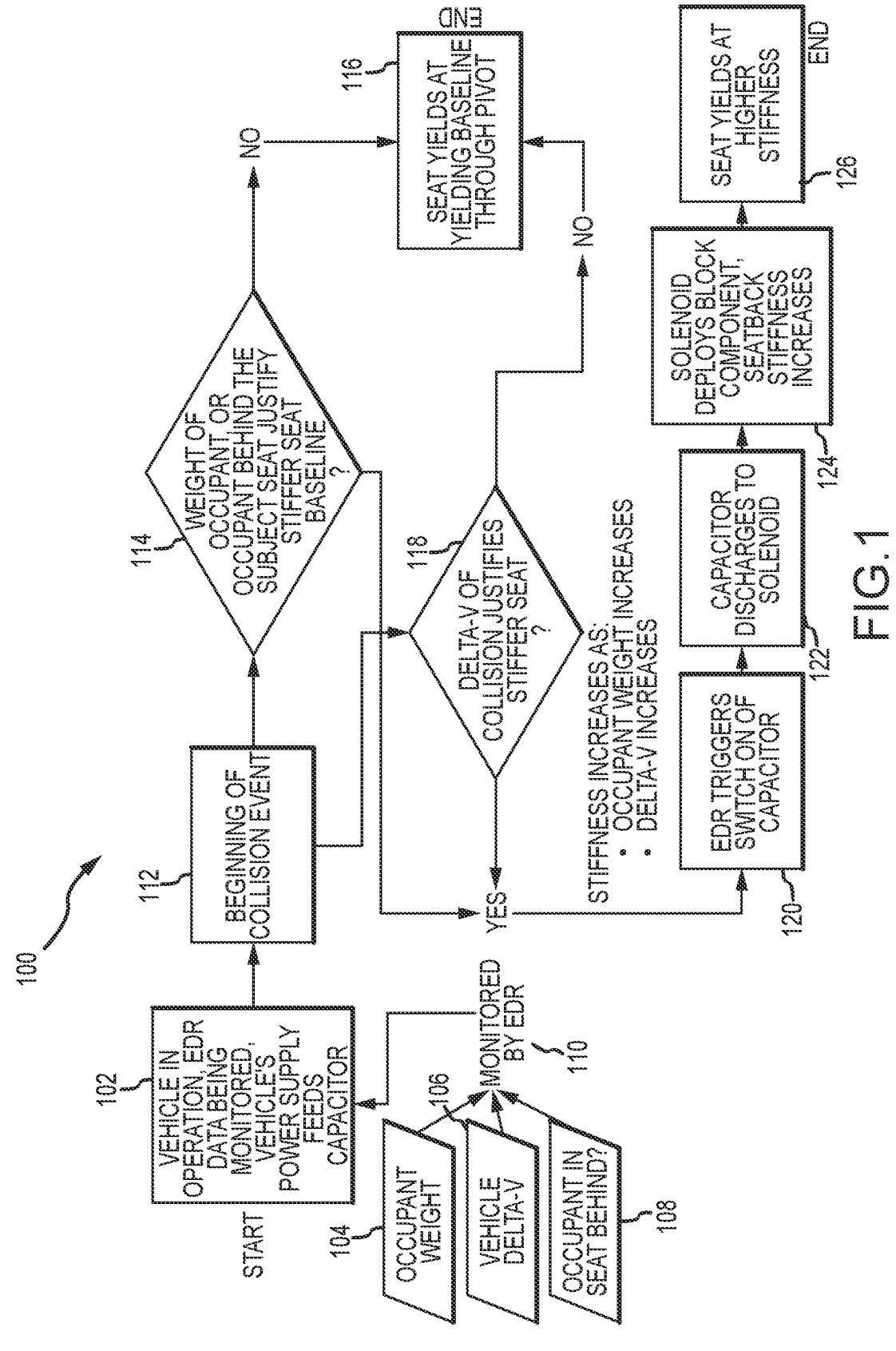
FIG. 1 is a flow diagram of a system or method for limiting yielding of a seatback in a rear-impact collision, according to an embodiment.

Embodiments disclosed herein include systems and methods having vehicle (e.g. automobile) seats with an active, automatically adjusting and/or rearward deflection (e.g., yielding or pivoting) of seatbacks in a rear-impact collision for improved rear-impact safety. In conventional vehicle systems, when a vehicle is involved in a rear-impact collision or crash, a forward (e.g., front) seat in the vehicle deforms during the rear-impact crash to absorb energy and protect the front occupant in the forward seat. For example, the seatback of the forward seat yields (e.g., pivots) rearward relative to the seat bottom of the forward seat. If, however, there is another, rearward occupant in the vehicle sitting directly behind the forward seat in a rearward (e.g., back or rear) seat, the deformation of the forward seat during the rear-impact crash can interfere with the cabin space of the rearward occupant in the rearward seat as the seatback yields onto the rearward occupant. In some cases, this yielding of the forward seatback can cause injury to the rearward occupant. Moreover, during higher-speed impacts, increased seatback stiffness will length the deformation of the seat over the entire duration of the impact.

At least one, some or all embodiments described herein include vehicle seats and/or deformation limiting (e.g. restriction) systems configured to automatically adjust yielding of a seatback of the forward seat during a rear-impact collision (e.g., rear-ended) based on at least whether or not a passenger is positioned in the vehicle directly behind the forward seat. This configuration in at least one, some, or all embodiments results in the technical effect of preventing, limiting, or at least partially inhibiting deformation (e.g., pivoting or yielding) of the seatback of the forward seat and subsequent possible contact with the occupant seated behind the forward seat in the rearward seat. In at least one, some, or all embodiments, the systems and methods described herein result in the technical effect of protecting an occupant (e.g., passenger) in a (rearward) seat directly behind another (e.g., front) seat of a vehicle by preventing, inhibiting, restricting, or otherwise limiting deformation, yielding, or pivoting of the seatback of the front seat towards the rearward seat. As used herein, "yielding" of the seatback is the rearward pivoting or deflection (e.g., designed or intended pivoting or deflection) of the seatback responsive to a rear-impact event. As used herein, "stiffness" of the seatback is the resistance to pivoting or deflection of the seatback responsive to a rear-impact event. As used herein, "deformation" of the seatback is the amount of pivoting or deflection of the seatback responsive to a rear-impact event.

In at least one, some, or all embodiments described herein, the resistance of the seatback to rearward yielding or deflection responsive to a rear-impact collision is adjusted by using an electromechanical device to push a wedge into a slot of a detent structure having a first region secured to the seatback and a second region secured to the seat bottom. The slot of the detent structure may be positioned near a hinge of the seat, and the linear position or depth of the wedge within the slot alters the amount of resistance of the seatback to rearward yielding or deflection during a rear-impact collision. Inserting the wedge deeper into the slot provides more resistance to yielding or deflection of the seatback than a more shallow insertion of the wedge into the slot. For example, if crash parameters indicate the seatback should have more resistance to rearward yielding or deflection, the wedge is pushed deeper into the slot, whereas if crash parameters indicate the seatback should have less resistance to rearward yielding or deflection, the wedge is pushed a smaller (e.g., less) distance into the slot. According to at least one, some, or all embodiments, the distance the wedge is inserted or pushed into the slot is determined by an onboard vehicle crash computer associated with the vehicle or an Event Data Record (EDR). In some embodiments, the electromechanical device that deploys (or does not deploy) the wedge during a rear-impact collision may use at least one algorithm used to deploy airbags in the vehicle or tension seatbelts in the vehicle.

The amount of resistance by the systems and methods described herein to rearward yielding or deflection of the seatback may be based on one or more factors. In some embodiments, a computer system in the vehicle may determine at least an approximate weight of the occupant of the forward seat, and the amount of resistance to rearward yielding or deflection of the forward seat may be based at least partially on the approximate weight of the occupant of the forward seat. For example, heavier occupants in the forward seat may require more resistance to yielding or deflection of the seatback than lighter occupants. In some embodiments, a computer system in the vehicle may determine at least an approximate change in velocity (delta-V) of the vehicle due to the rear-impact collision (such as a computer system that monitors delta-V for airbag deployment), and the amount of resistance to rearward yielding or deflection of the forward seat may be based at least partially on the approximate change in velocity due to the rear-impact collision. For example, higher velocity rear-impact collisions may require more resistance to yielding or deflection of the seatback than lower velocity rear-impact collisions. The approximate force or velocity of the rear-impact collision may be measured by one or more sensors of the EDR in the vehicle. In some embodiments, a computer system that includes the EDR in the vehicle may determine whether or not an occupant is in the rearward seat directly behind the forward seat, and the amount of resistance to rearward yielding or deflection of the forward seat may be based at least partially on whether or not an occupant is in the rearward seat. For example, a sensor (e.g., pressure sensor) in rearward seat may be used to determine that the rearward seat is unoccupied, the systems described herein may be directed to provide no additional resistance to yielding or deflection of the seatback of the forward seat. If, however, a pressure sensor in the rearward seat indicate the rearward seat is occupied, the systems described herein may be directed to provide resistance to yielding or deflection of the seatback of the forward seat.

One or more (e.g., all) of the factors described above may determine the linear position or depth of the wedge within the slot to alter the amount of resistance of the seatback to rearward yielding or deflection during a rear-impact collision. This configuration of the systems and methods described herein results in the technical effect of providing an optimal amount of resistance yielding or deflection of the seatback of a forward seat during a rear-impact collision. For example, optimal amounts of resistance to yielding or deflection of the seatback of a forward seat during a rear-impact collision may be provided for a range of occupant weights and change in velocity due to rear-impact collisions, especially when compared to conventional systems.

Turning to FIG. 1, a flow diagram 100 (e.g., decision tree or algorithm) in systems and methods for limiting rearward deflection or yielding of a seatback in a rear-impact collision, according to an embodiment. In an embodiment, a vehicle may be in operation, with EDR data being monitored by a computer system of the vehicle 102. The weight of a forward occupant in the forward seat of the vehicle 104, the velocity (or change in delta-V) of the vehicle 106, and presence of a rearward occupant in a rearward seat of the vehicle directly behind the forward seat 108 may be monitored by the EDR 110 in the computer system in the vehicle. One or more sensors (e.g., accelerometer, capacitor) may detect delta-V (e.g., a change in the velocity of the vehicle) indicative of a rear-impact collision). A power supply of the vehicle may power the actuator (e.g., capacitor) of the seatback deformation limiting system.

When one or more sensors of the EDR detect a collision event (e.g., rear-impact collision) 112, the computer system of the vehicle may automatically determine whether the weight of the forward occupant in the forward seat or presence of the rearward occupant in the rearward seat directly behind the forward seat justify a stiffer (e.g., increased resistance to or limiting of yielding, deflection, or pivoting) forward seat than the baseline 114. If no, then the computer system does not activate the seatback deformation limiting system, and the seatback of the forward seat yields (e.g., deflects or deforms) at the baseline amount 116. When the collision event (e.g., rear-impact collision) begins, the computer system of the vehicle may determine whether the force or velocity (e.g., delta-V, or the change in velocity of the vehicle) of the rear-impact collision justifies a stiffer (e.g., increased resistance to yielding or deflection) forward seat than the baseline amount 118. If no, then the computer system does not activate the seatback deformation limiting system, and the seatback of the forward seat yields (e.g., deflects or deforms) at the baseline amount 116.

If the computer system of the vehicle determines the weight of the forward occupant in the forward seat or presence of the rearward occupant in the rearward seat directly behind the forward seat does justify a stiffer (e.g., increased resistance to yielding or deflection) forward seat than the baseline amount, then the EDR of the computer system may trigger the actuator (e.g., a switch on a capacitor) of the seatback deformation limiting system 120. When the EDR of the computer system triggers the actuator, the actuator may deploy a block component (e.g., wedge). More specifically, the capacitor of the actuator may discharge to a solenoid of the seatback deformation limiting system 122, and the solenoid may deploy the block component 124. The block component may be deployed by the actuator into a slot of a detent structure of the seatback deformation limiting system on the forward seat, thereby resulting in the forward seat yielding at a higher stiffness than the baseline amount (e.g., the seatback of the forward seat is more resistant to yielding or deflection) 126.

If the computer system of the vehicle determines the velocity (e.g., delta-V) of the rear-impact collision justifies a stiffer (e.g., increased resistance to yielding or deflection) forward seat than the baseline, then the EDR of the computer system may trigger the actuator (e.g., a switch on a capacitor) of the seatback deformation limiting system 120. When the EDR of the computer system triggers the actuator, the actuator may deploy a block component (e.g., wedge). More specifically, the capacitor of the actuator may discharge to a solenoid of the seatback deformation limiting system, and the solenoid may deploy the block component 124. The block component may be deployed by the actuator into a slot of a detent structure of the seatback deformation limiting system on the forward seat, thereby resulting in the forward seat yielding at a higher stiffness than the baseline amount (e.g., the seatback of the forward seat is more resistant to yielding or deflection) 126. The amount of resistance to yielding or deflection provided by the seatback deformation limiting system may be based on (e.g., proportional to) at least one of the occupant weight or the force of the rear-impact collision. For example, the amount of resistance to yielding or deflection provided by the seatback deformation limiting system may increase as the weight of the forward occupant in the forward seat increases and/or the force (delta-V) of the rear-impact collision increases.

Turning now to FIGS. 2A-2D, isometric views of a vehicle seat system 200, according to an embodiment. The vehicle seat system 200 may be used with a vehicle seat that is the forward (e.g., front) seat in a vehicle (e.g., automobile). The vehicle seat may include a seat bottom frame 205 and a seatback frame 210. The seat bottom frame 205 is secured, directly or indirectly, to the chassis (not shown) of the vehicle. For example, the seat bottom frame 205 may be secured to a floor frame of the vehicle chassis or any other portion of the vehicle chassis. The vehicle seat shown in FIGS. 2A-2D is merely an example of a seat frame of a vehicle seat, and the vehicle seat used in the systems and methods described herein may include any vehicle seat having a seatback secured (e.g., pivotably secured) to a seat bottom.

The vehicle seat system 200 also includes a seatback deformation limiting system 220, according to an embodiment. The seatback deformation limiting system 220 may be incorporated or retrofit into a pre-existing vehicle seat, or may be included with a new vehicle seat. The seatback deformation limiting system 220 may include a frame assembly configured to selectively allow the seatback frame 210 to pivot and also selectively prevent, limit, inhibit, or otherwise restrict the seatback frame from pivoting 210 towards a rearward seat directly behind the vehicle seat. In the vehicle seat system 200, the frame assembly of the seatback deformation limiting system 220 includes a detent structure having a first region 240a secured to the seat bottom frame and a second region 240b secured to the seatback frame 210. The first region 240a and the second region 240b may be secured or attached directly to the seat bottom frame 205 and the seatback frame 210, respectively. In some embodiments, the first region 240a and the second region 240b are secured or attached to plates 235 that are attached or secured directly to the seat bottom frame 205 and the seatback frame 210, respectively. In some embodiments, the detent structure including the first region 240a and the second region 240b is configured to be retrofit to pre-existing seatback frames.

The first region 240a and the second region define a slot 245 therebetween, according to an embodiment. The slot 245 may narrow from an opening oriented towards the rearward seat (not shown) or oriented towards a top of the seatback frame 210. In some embodiments, the slot 245 may be substantially wedge-shaped, V-shaped, or U-shaped. The detent structure defining the slot 245 may, in some aspects, may act, with the rest of the seatback deformation limiting system, as a selectively deformable or restrictable hinge that allows or inhibits the seatback frame 210 from pivoting relative to the seat bottom frame 205. The detent structure defining the slot 254, including the first region 240a and the second region 240b of the detent structure, may include numerous materials, such as carbon steel.

The seatback deformation limiting system 220 also includes a deployable insert 230 sized and dimensioned to fit at least partially within the slot 245 between the first region 240a and the second region 240b of the detent structure. The insert 230 may be shaped substantially complementary to the slot 245. For example, the insert 230 may be wedge-shaped, V-shaped, or U-shaped complementary to the slot 245. The insert 230 may include numerous materials, such as carbon steel.

In some embodiments at least one of the insert 230 or the detent structure including the first region 240a and the second region 240b may include a guide or track configured to guide or otherwise direct the insert 230 into the slot 245 and/or maintain the insert 230 in the slot 245. For example, the first region 240a and the second region 240b may include inward-oriented recessed tracks sized to hold the at least a periphery or edge of the insert 230 therein. The insert 230 may include outward-oriented tracks sized to hold a portion of the first region 240a and the second region 240b therein as the insert 230 is inserted and positioned in the slot 245.

The seatback deformation limiting system 220 also includes an actuator 225 secured to the insert 230 and configured to selectively insert or deploy the insert 230 at least partially into the slot 245, according to an embodiment. In the vehicle seat system 200, the actuator 225 is secured to the seat bottom frame 205. In some embodiments, the actuator 225 may be secured to the seatback frame 210 or elsewhere on the vehicle seat. The actuator 225 may include an electromechanical device, such as a solenoid powered by a capacitor that is powered by the electrical system of the vehicle, pneumatic actuator, or any other suitable types of actuators.

Figure 2A:
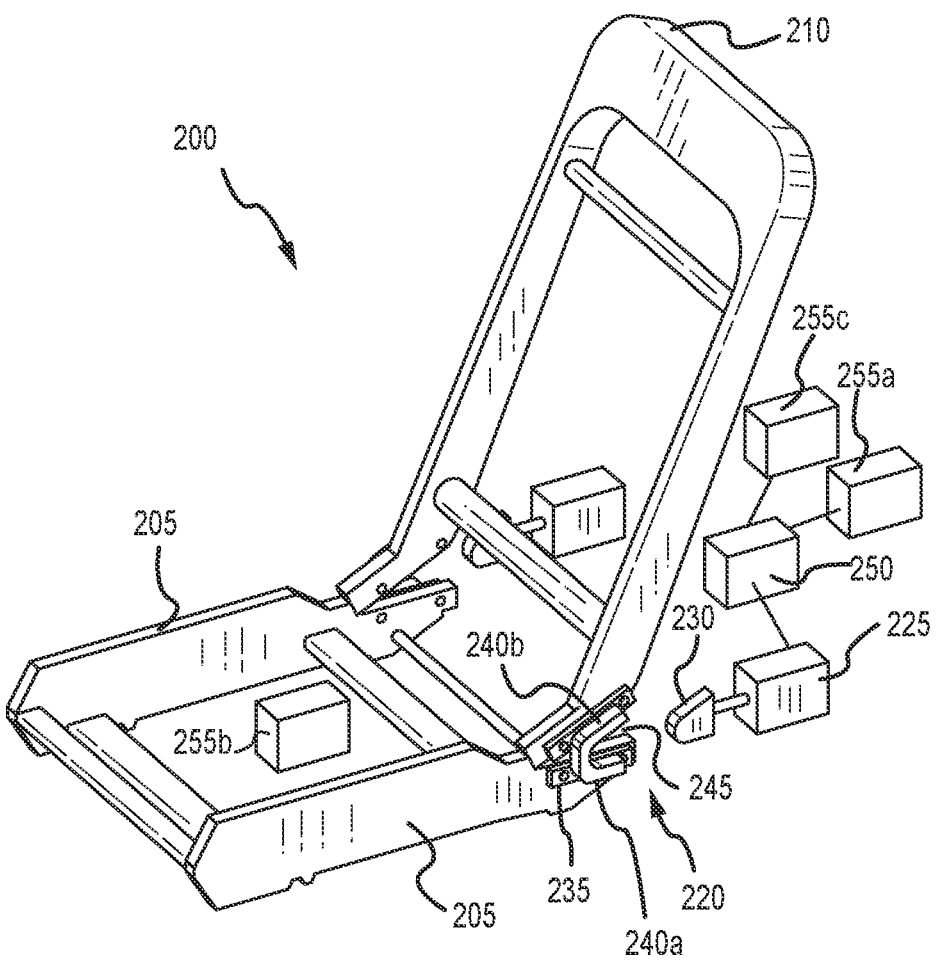
FIGS. 2A-2D are isometric views of a seat frame of a seat and a seatback deformation limiting system, according to an embodiment.

In some embodiments, the linear position or depth of the insert 230 within the slot 245 alters the amount of resistance of the seatback frame 210 to rearward yielding or deflection towards a rearward seat during a rear-impact collision. Inserting or deploying the insert 230 deeper into the slot 245 provides more resistance to yielding or deflection of the seatback frame 210 than a more shallow insertion or deployment of the insert 230 into the slot 245. FIG. 2A shows the insert 230 completely removed or absent from the slot 245. With the insert 230 or absent from the slot 245, the seatback deformation limiting system 220 may provide minimal or no resistance to the seatback frame 210 deflecting or deforming rearward towards the rearward seat directly behind the seatback frame 210.

Figure 2B:
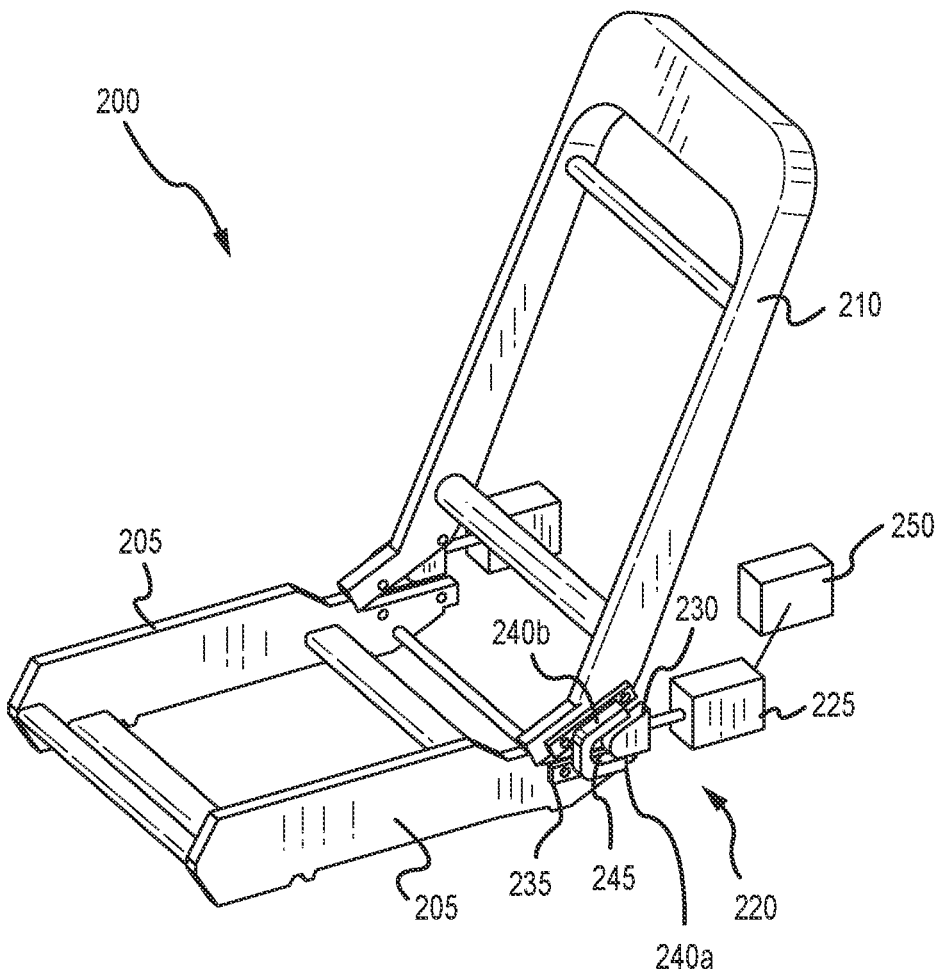
Figure 2C:
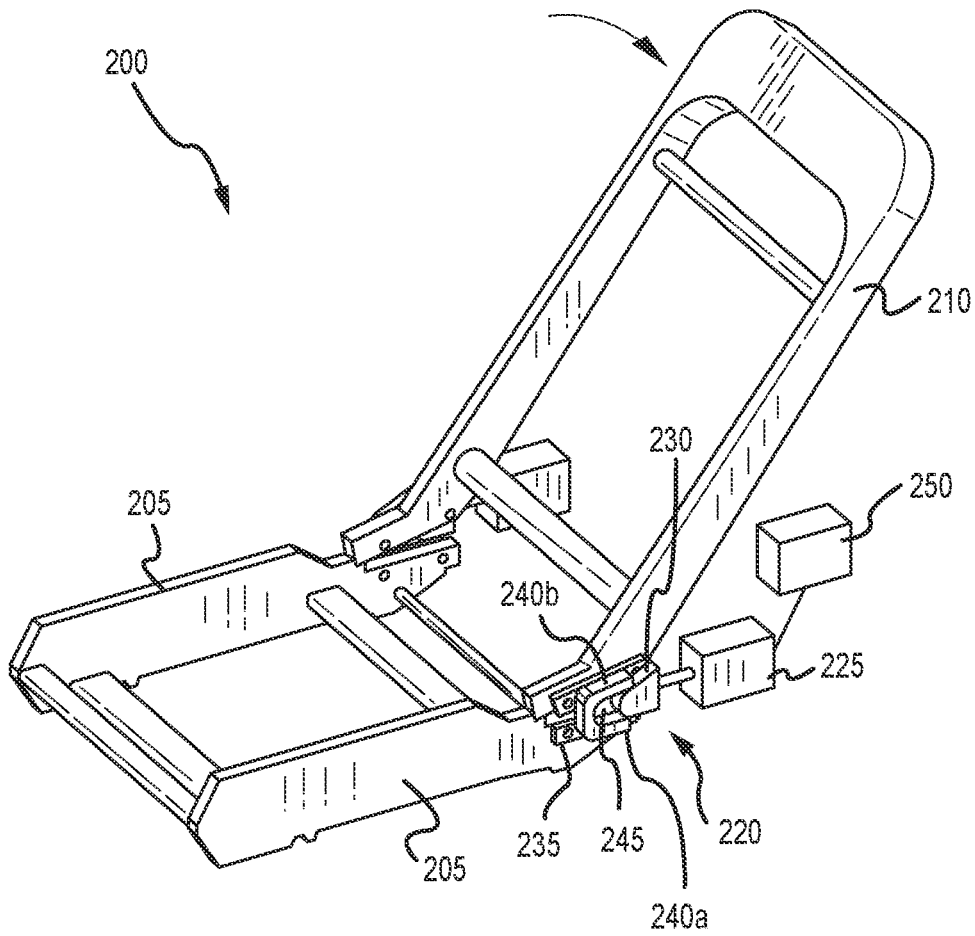

FIGS. 2B-2C show the insert 230 only partially inserted or deployed into the slot 245, according to an embodiment. More specifically, FIG. 2B shows the insert 230 only partially inserted into the slot 245 before the seatback frame 210 has deflected or yielded, and FIG. 2C shows the insert 230 only partially inserted into the slot 245 after the seatback frame 210 has deflected or yielded due to a rear-impact collision. Partial insertion or deployment of the insert 230 a first distance into the slot 245 allows the seatback frame 210 to pivot a first amount (shown in FIG. 2C) before limiting, inhibiting, or preventing the seatback frame 210 from yielding (e.g., pivoting) further towards the rearward seat in the vehicle directly behind the forward seat.

Figure 2D:
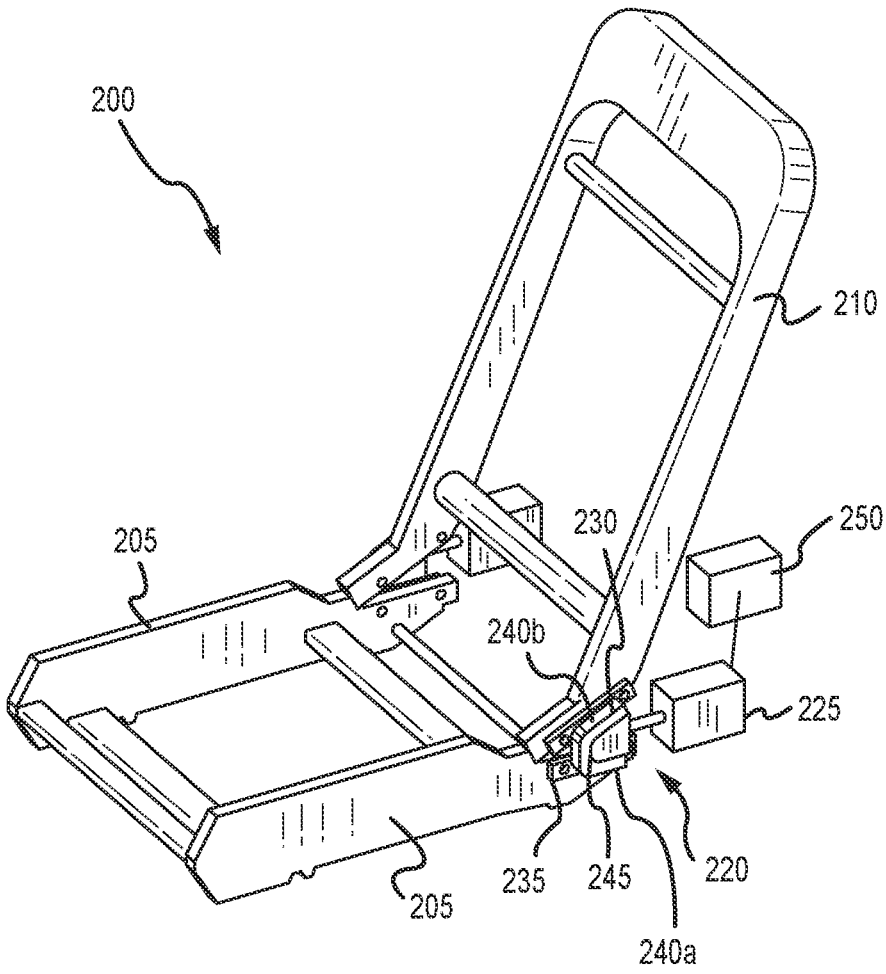

FIG. 2D shows the insert 230 deployed or inserted completely or entirely (e.g., all the way) into the slot 245. Insertion or deployment of the insert a second distance (e.g., all the way) into the slot 245 greater than the first distance shown in FIGS. 2B-2C limits, inhibits, or prevents the seatback frame yielding towards the rearward seat in the vehicle directly behind the forward seat, as shown in FIG. 2D. If the insert 230 is deployed or inserted into the slot 245 a second distance that is greater than the first distance shown in FIGS. 2B-2C, but not all the way into the slot 245, the seatback frame 210 is allowed to yield a second amount less than the first amount shown in FIG. 2C before inhibiting the seatback frame 210 from yielding towards the rearward seat in the vehicle directly behind the forward seat.

Figure 5:
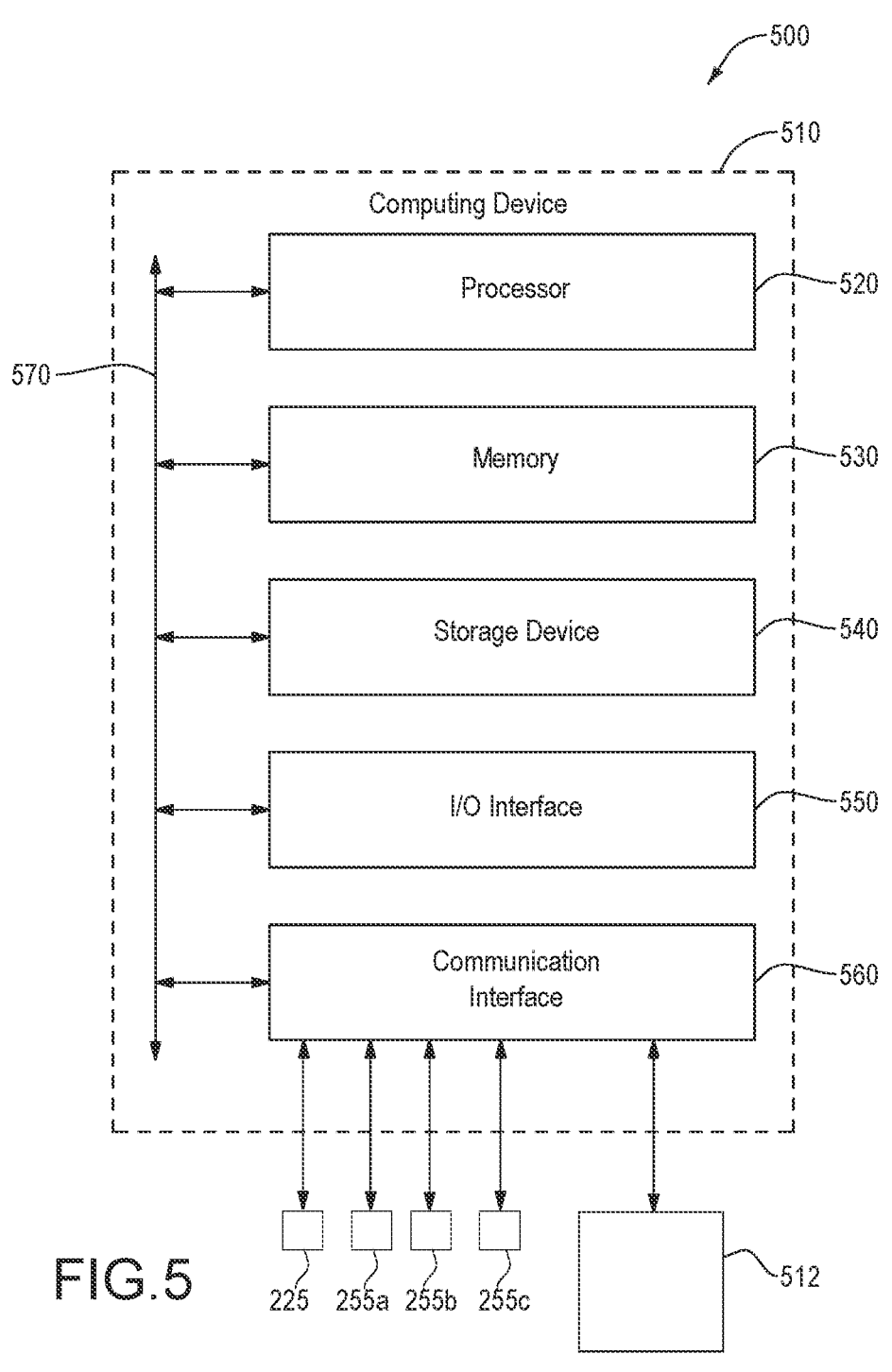
FIG. 5 is a block diagram of a controller, according to an embodiment.

The vehicle seat system 200 also may include a computer system 250 operably coupled to the actuator 225. Although the computer system 250 is shown as a block behind the seatback frame 210, the computer system 250 may be positioned anywhere in the vehicle. The computer system 250, for example, may include the main computer system and/or the EDR of the vehicle, with the actuator 225 being operably coupled thereto. FIG. 5 and the accompanying description herein provide more detailed descriptions of the components of the computer system 250.

The computer system 250 is configured to detect a rear-impact collision in a vehicle. For example, the computer system 250 may be operable coupled to sensors 255c (shown schematically as box 255c in FIG. 2A) in the vehicle (e.g., the rear of the vehicle) configured to detect a rear-impact collision and/or a force, delta-V, or velocity of a rear-impact collision. The actuator 225 is operably coupled to the computer system 250 and configured to insert or deploy the insert 230 at least partially into the slot 245 responsive to the computer system 250 detecting the rear-impact collision in the vehicle. At least partial insertion of the insert 230 into the slot 245 is effective to limit, inhibit, or prevent the seatback frame 210 from yielding towards the rearward seat in the vehicle directly behind the vehicle seat.

In some embodiments, the computer system in the vehicle may determine whether or not an occupant is in the rearward seat directly behind the forward seat, and the amount of resistance to rearward yielding or deflection of the forward seat may be based at least partially whether or not an occupant is in the rearward seat. One or more pressure sensors 255a (shown schematically as box 255a in FIG. 2A)

in or under the rearward seat may detect if the rearward seat in the vehicle directly behind the vehicle forward seat is occupied by a rearward occupant, and the one or more pressure sensors 255a may be operably coupled to the computer system 250. If the pressure sensor 255a in the rearward seat and the computer system 250 determine that the rearward seat is unoccupied, the computer system 250 may direct the actuator 225 to provide no additional resistance to yielding or deflection of the seatback frame 210 of the forward seat (e.g., direct the actuator 225 to not insert or deploy the insert 230 into the slot 245). Accordingly, responsive to the computer system 250 detecting the rear-impact collision in the vehicle, the computer system 250 may be configured to direct the actuator 225 not to insert or deploy the insert 230 at least partially into the slot 245 if the rearward seat is not occupied by the rearward occupant. If, however, the pressure sensor 255a in the rearward seat indicates the rearward seat is occupied, the computer system 250 described herein may direct the actuator 225 to provide resistance to yielding or deflection of the seatback frame 210 of the forward seat by at least partially inserting or deploying the insert 230 into the slot 245. Accordingly, responsive to the computer system 250 detecting the rear-impact collision in the vehicle, the computer system 250 may be configured to direct the actuator 225 to insert or deploy the insert 230 at least partially into the slot 245 if the rearward seat is occupied by the rearward occupant.

As provided above, inserting or deploying the insert 230 deeper into the slot 245 provides more resistance to yielding or deflection of the seatback frame 210 than a more shallow insertion of the insert 230 into the slot 245. In many embodiments, the computer system 250 may determine a selected distance to insert or deploy the insert 230 into the slot 245 responsive to a rear-impact collision or not insert or deploy the insert 230 into the slot responsive to a rear-impact collision. For example, if the computer system 250 determines that one or more parameters or characteristics indicate that the seatback frame 210 should have more resistance to rearward yielding or deflection, the computer system 250 may direct the actuator 225 to insert or deploy the insert 230 deeper into the slot 245 responsive to a rear-impact collision. If the computer system determines that one or more parameters indicate the seatback frame 210 should have less or no resistance to rearward yielding or deflection, the computer system 250 may direct the actuator 225 to insert or deploy the insert 230 less of a distance into the slot 245 (or not at all) responsive to a rear-impact collision.

According to at least one, some, or all embodiments, the distance the computer system 250 determines the insert 230 should be inserted or deployed into the slot 245, and hence the amount of resistance to yielding or deflection of the seatback frame 210, may be based on one or more factors. In some embodiments, the system includes one or more sensors 255b (shown schematically as box 255b in FIG. 2A) in or under the forward vehicle seat. The one or more sensors 255b and/or the computer system 250 are configured to detect at least an approximate weight of the occupant of the forward vehicle seat. The computer system 250 may then determine a distance to insert or deploy the insert 230 into the slot 245, and the correlated amount of resistance to rearward yielding or deflection of the forward seat, based at least partially on the approximate weight of the occupant of the forward seat. For example, heavier occupants in the forward seat may require the insert 230 to be deployed or inserted further into the slot 245 (e.g., require more resistance to yielding or deflection of the seatback) than lighter occupants.

In some embodiments, the computer system 250 in the vehicle may determine at least an approximate force or velocity (delta-V) of the rear-impact collision. The computer system 250 may then determine a distance to insert or deploy the insert 230 into the slot 245, and the correlated amount of resistance to rearward yielding or deflection of the forward seat, based at least partially on the approximate force or velocity (delta-V) of the rear-impact collision. For example, higher force or velocity rear-impact collisions may require the insert 230 to be deployed or inserted further into the slot 245 (e.g., require more resistance to yielding or deflection of the seatback) than lower force or velocity rear-impact collisions.

In some embodiments, the computer system 250 in the vehicle may determine whether or not an occupant is in the rearward seat directly behind the forward seat. If the computer system 250 determines there is an occupant in the rearward seat, the computer system may direct the actuator 225 to insert or deploy the insert 230 a first distance into the slot 245 (e.g., only partially into the slot 245) or a second distance into the slot 245 (e.g., all the way into the slot 245) based at least partially on one or more of the force of the rear-impact collision or the approximate weight of the forward occupant. If the computer system 250 determines there is no occupant in the rearward seat, the computer system 250 may direct actuator to insert or deploy the insert 230 into the slot 245. This configuration results in the technical effect of providing an optimal amount of resistance to yielding or deflection of the seatback of a forward seat during a rear-impact collision. For example, optimal amounts of resistance to yielding or deflection of the seatback of a forward seat during a rear-impact collision may be provided for a range of occupant weights and force or velocity of rear-impact collisions, especially when compared to conventional systems.

Figure 3A:
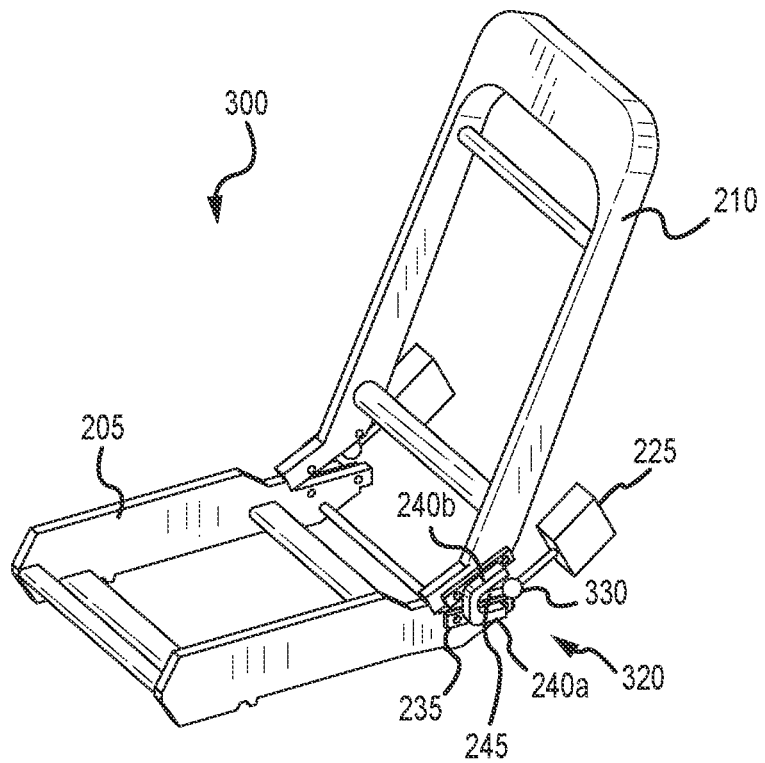
FIG. 3A is an isometric view of a seat frame of a seat and a seatback deformation limiting system, according to an embodiment.
Figure 3B:
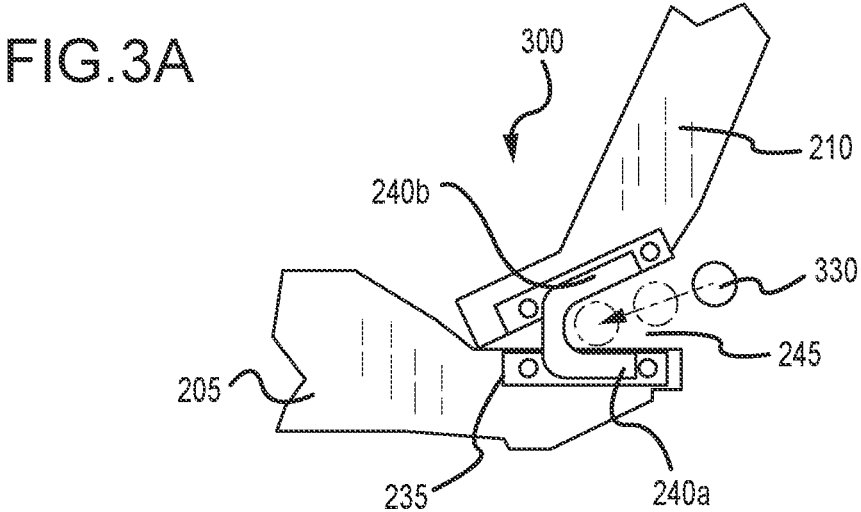
FIG. 3B is a side view of the seatback deformation limiting system of FIG. 3A.

Turning now to FIGS. 3A-3B, a vehicle seat system 300 may include a seatback deformation limiting system 320. Unless otherwise noted, the vehicle seat system 300 and the seatback deformation limiting system 320 may include any aspect of the vehicle seat system 200 and the seatback deformation limiting system 220. In some embodiments, the seatback deformation limiting system 320 includes a rigid ball 330 or rigid cylinder extendably and retractably secured to the actuator 225. The actuator 225 may be configured to insert the ball 330 at least partially into the slot 245, as described above in relation to the insert 230 and the actuator 225. For example, as shown in FIG. 3B, the ball 330 may be inserted partially or all the way into the slot 245, based on variable described above in relation to the vehicle seat system 200. In the vehicle seat system 300, the actuator 225 is secured to the seatback frame 210. In these and other embodiments, the actuator 225 and the insert 330 are positioned in-line with the seatback frame 210 such that slot 245 is oriented upwards towards the top of the seatback frame 210 and the actuator 225 does not protrude from the vehicle seat. In some embodiments, the actuator 225 may be secured to the seat bottom frame 205 or elsewhere on the vehicle seat.

Figure 4A:
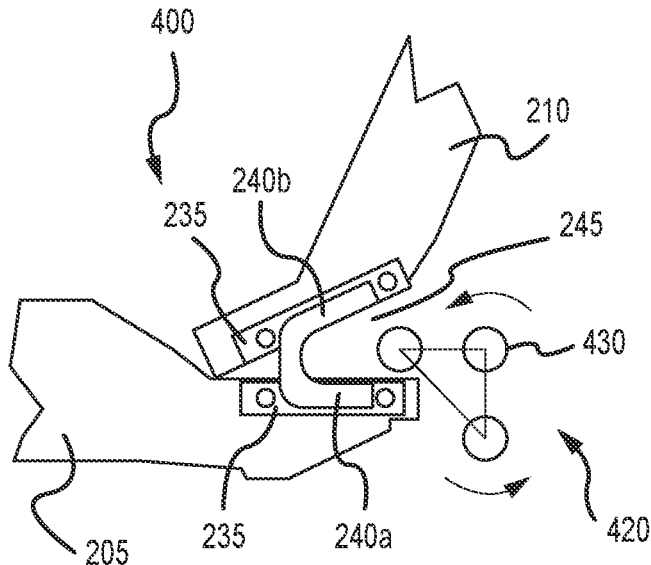
FIG. 4A is a side view of a seatback deformation limiting system, according to an embodiment.

Turning now to FIG. 4A, a vehicle seat system 400 may include a seatback deformation limiting system 420. Unless otherwise noted, the vehicle seat system 400 and the seatback deformation limiting system 420 may include any aspect of the vehicle seat system 200, 300 and the seatback deformation limiting system 220, 320. In some embodiments, the seatback deformation limiting system 420 includes a rigid ball 430 or rigid cylinder extendably and retractably secured to the actuator 225 (not shown). The actuator 225 may be positioned and configured to rotate the ball 430 at least partially into the slot 245, as described above in relation to the insert 230 and the actuator 225. In the vehicle seat system 400, the actuator 225 may be secured to the seatback frame 210, the seat bottom frame, or elsewhere on the vehicle seat, as described above in relation to the vehicle seat system 200, 300.

Figure 4B:
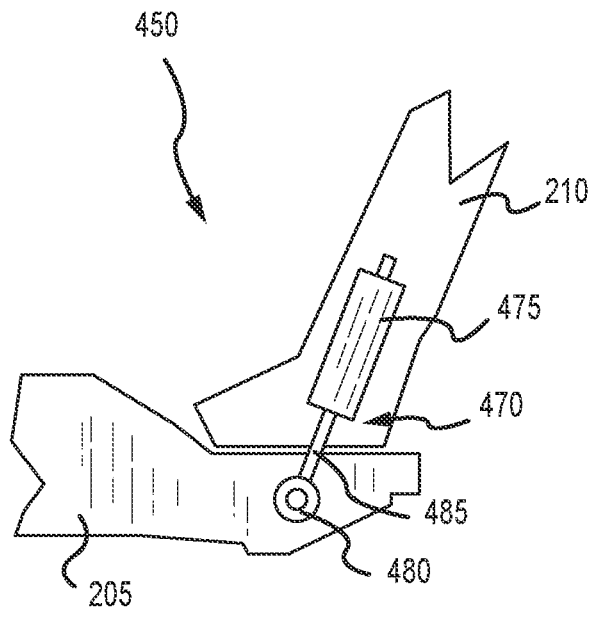
FIG. 4B is a side view of a seatback deformation limiting system, according to an embodiment.

Turning now to FIG. 4B, a vehicle seat system 450 may include a seatback deformation limiting system 470. Unless otherwise noted, the vehicle seat system 450 may include any aspect of the vehicle seat system 200, 300, 400. The seatback deformation limiting system 470 includes a frame assembly configured to selectively allow the seatback frame to yield (e.g., pivot) and also selectively limit, prevent, or inhibit the seatback frame from yielding. More specifically, the seatback deformation limiting system 470 may include an electromechanical damper or shock absorber operably coupled to the computer system 250 and configured to selectively allow the seatback frame to pivot and also selectively limit, prevent, or inhibit the seatback frame from deflecting or yielding. The electromechanical damper may include a body 475 secured to the seatback frame 210, a bearing 480 secured to the seat bottom frame 205, and an arm 485, piston, or screw extending between the body 475 and the bearing 480. Controlled or limited retraction of the arm 485 into the body 475 allows for controlled or limited yielding or deflection of the seatback frame 210. Accordingly, the computer system 250 may control how much the arm 485 is allowed to retract (or not retract) into the body 475 responsive to a rear-impact collision. How much the arm 485 is allowed to retract (or not retract) into the body 475, and thus the amount of resistance to deformation and yield of the seatback frame 210, may be determined by the computer system 250 based at least partially on the variables described above in the vehicle seat system 200 (e.g., weight of the occupant in the forward seat and/or force or velocity of the rear-impact collision).

Any of the example systems disclosed herein may be used to carry out any of the example methods disclosed herein, such as using a controller. FIG. 5 is a schematic of a controller 500 for executing any of the example methods disclosed herein, according to an embodiment. The computer system 250 may include any aspect of the controller 500. The controller 500 may be configured to implement any of the example methods disclosed herein, such as the method 600. The controller 600 includes at least one computing device 510. The at least one computing device 510 is an exemplary computing device that may be configured to perform one or more of the acts described above, such as the method 200 or 300. The at least one computing device 510 can include one or more servers, one or more computers (e.g., desk-top computer, lap-top computer), or one or more mobile computing devices (e.g., smartphone, tablet, etc.). The computing device 510 can comprise at least one processor 520, memory 530, a storage device 540, an input/output ("I/O") device/interface 550, and a communication interface 560. While an example computing device 510 is shown in FIG. 5, the components illustrated in FIG. 5 are not intended to be limiting of the controller 500 or computing device 510. Additional or alternative components may be used in some examples. Further, in some examples, the controller 500 or the computing device 510 can include fewer components than those shown in FIG. 5. For example, the controller 500 may not include the one or more additional computing devices 512. In some examples, the at least one computing device 510 may include a plurality of computing devices, such as a server farm, computational network, or cluster of computing devices. Components of computing device 510 shown in FIG. 5 are described in additional detail below.

In some examples, the processor(s) 520 includes hardware for executing instructions (e.g., instructions for carrying out one or more portions of any of the methods disclosed herein), such as those making up a computer program. For example, to execute instructions, the processor(s) 520 may retrieve (or fetch) the instructions from an internal register, an internal cache, the memory 530, or a storage device 540 and decode and execute them. In particular examples, processor(s) 520 may include one or more internal caches for data such as look-up tables. As an example, the processor(s) 520 may include one or more instruction caches, one or more data caches, and one or more translation lookaside buffers (TLBs). Instructions in the instruction caches may be copies of instructions in memory 530 or storage device 540. In some examples, the processor 520 may be configured (e.g., include programming stored thereon or executed thereby) to carry out one or more portions of any of the example methods disclosed herein.

In some examples, the processor 520 is configured to perform any of the acts disclosed herein such as in method 600 or cause one or more portions of the computing device 510 or controller 500 to perform at least one of the acts disclosed herein. Such configuration can include one or more operational programs (e.g., computer program products) that are executable by the at least one processor 520. For example, the processor 520 may be configured to automatically detect a rear-impact collision of the vehicle, automatically determine, if the rearward seat in the vehicle directly behind the vehicle seat is occupied by a rearward occupant, automatically determine an approximate weight of a forward occupant sitting in the vehicle seat, automatically determine a force of the rear-impact collision, and/or automatically determine whether to insert the insert into the slot a first distance or a second distance based on at least one of the approximate weight of the forward occupant sitting in the vehicle seat or the force of the rear-impact collision.

The at least one computing device 510 (e.g., a server) may include at least one memory storage medium (e.g., memory 530 and/or storage device 540). The computing device 510 may include memory 530, which is operably coupled to the processor(s) 520. The memory 530 may be used for storing data, metadata, and programs for execution by the processor(s) 520. The memory 530 may include one or more of volatile and non-volatile memories, such as Random Access Memory (RAM), Read Only Memory (ROM), a solid state disk (SSD), Flash, Phase Change Memory (PCM), or other types of data storage. The memory 530 may be internal or distributed memory.

The computing device 510 may include the storage device 540 having storage for storing data or instructions. The storage device 540 may be operably coupled to the at least one processor 520. In some examples, the storage device 540 can comprise a non-transitory memory storage medium, such as any of those described above. The storage device 540 (e.g., non-transitory storage medium) may include a hard disk drive (HDD), a floppy disk drive, flash memory, an optical disc, a magneto-optical disc, magnetic tape, or a Universal Serial Bus (USB) drive or a combination of two or more of these. Storage device 540 may include removable or non-removable (or fixed) media. Storage device 540 may be internal or external to the computing device 510. In some examples, storage device 540 may include non-volatile, solid-state memory. In some examples, storage device 540 may include read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these. In some examples, one or more portions of the memory 530 and/or storage device 540 (e.g., memory storage medium(s)) may store one or more databases thereon.

In some examples, data may be stored in a memory storage medium such as one or more of the at least one processor 520 (e.g., internal cache of the processor), memory 530, or the storage device 540. In some examples, the at least one processor 520 may be configured to access (e.g., via bus 570) the memory storage medium(s) such as one or more of the memory 530 or the storage device 540. For example, the at least one processor 520 may receive and store the data (e.g., look-up tables) as a plurality of data points in the memory storage medium(s). The at least one processor 520 may execute programming stored therein adapted access the data in the memory storage medium(s) to automatically detect a rear-impact collision of the vehicle, automatically determine, if the rearward seat in the vehicle directly behind the vehicle seat is occupied by a rearward occupant, automatically determine an approximate weight of a forward occupant sitting in the vehicle seat, automatically determine a force or delta-V from a the rear-impact collision, and/or automatically determine whether to insert the insert into the slot a first distance or a second distance based on at least one of the approximate weight of the forward occupant sitting in the vehicle seat or the force of the rear-impact collision. For example, the at least one processor 520 may access one or more look-up tables in the memory storage medium(s) such as memory 530 or storage device 540.

The computing device 510 also includes one or more I/O devices/interfaces 550, which are provided to allow a user to provide input to, receive output from, and otherwise transfer data to and from the computing device 510. These I/O devices/interfaces 550 may include a mouse, keypad or a keyboard, a touch screen, camera, optical scanner, network interface, web-based access, modem, a port, other known I/O devices or a combination of such I/O devices/interfaces 550. The touch screen may be activated with a stylus or a finger.

The I/O devices/interfaces 550 may include one or more devices for presenting output to a user, including, but not limited to, a graphics engine, a display (e.g., a display screen or monitor), one or more output drivers (e.g., display drivers), one or more audio speakers, and one or more audio drivers. In certain examples, I/O devices/interfaces 550 are configured to provide graphical data to a display for presentation to a user. The graphical data may be representative of one or more graphical user interfaces and/or any other graphical content as may serve a particular implementation.

The computing device 510 can further include a communication interface 560. The communication interface 560 can include hardware, software, or both. The communication interface 560 can provide one or more interfaces for communication (such as, for example, packet-based communication) between the computing device 510 and one or more additional computing devices 512 or one or more networks. For example, communication interface 560 may include a network interface controller (NIC) or network adapter for communicating with an Ethernet or other wire-based network or a wireless NIC (WNIC) or wireless adapter for communicating with a wireless network, such as a WI-FI. The computing device 510 of the controller 500 also is operably coupled and/or configured to wired or wirelessly communicate with the actuator 225 and the sensors 255*a*, 255*b*, 255*c*.

Any suitable network and any suitable communication interface 560 may be used. For example, computing device 510 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, one or more portions of controller 500 or computing device 510 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 510 may include any suitable communication interface 560 for any of these networks, where appropriate.

The computing device 510 may include a bus 570. The bus 570 can include hardware, software, or both that couples components of computing device 510 to each other. For example, bus 570 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

It should be appreciated that any of the examples of acts described herein, such as in the method 600 may be performed by and/or at the computing device 510 FIG. 6 is a flow diagram of a method 600 of controlling (e.g., restricting) a seatback frame from yielding rearward in a rear-impact collision of a vehicle. The method 600 includes an act 610 of providing a seat back restriction system secured to the seatback frame and the seat bottom frame. The method includes an act 620 of detecting, with a computer system of the vehicle, a rear-impact collision of the vehicle. The method 600 includes an act 630 of limiting, preventing, or inhibiting, with the seatback deformation limiting system, the seatback frame from yielding (e.g., pivoting) towards a rearward seat in the vehicle directly behind the vehicle seat responsive to direction from the computer system.

In some embodiments of the method 600, the frame assembly includes the seat restrictions systems 220, 320, or 420. For example, in some embodiments of the method 600, the frame assembly includes a detent structure having a first region secured to the seat bottom frame and a second region secured to the seatback frame, the first region and a second region defining a slot therebetween. The frame assembly also may include an insert sized and dimensioned to fit at least partially within the slot between the first region and the second region of the detent structure, and an actuator secured to the insert and configured to selectively insert the insert at least partially into the slot. In these and other embodiments, the act 630 further includes inserting the insert at least partially into the slot responsive to the computer system detecting the rear-impact collision in the vehicle effective to limit, inhibit, or prevent the seatback frame from yielding towards the rearward seat in the vehicle directly behind the vehicle seat. In some embodiments, the method 600 further includes an act of determining, with the computer system, if the rearward seat in the vehicle directly behind the vehicle seat is occupied by a rearward occupant. In these and other embodiments, the act 630 further includes, responsive to the computer system detecting the rear-impact collision in the vehicle, directing the actuator to insert or deploy the insert at least partially into the slot only if the rearward seat is occupied by the rearward occupant.

In some embodiments, the method 600 further includes determining at least one of an approximate weight of a forward occupant sitting in the vehicle seat or a force (or delta-V) of the rear-impact collision and/or determining whether to insert the insert into the slot a first distance or a second distance based on at least one of the approximate weight of the forward occupant sitting in the vehicle seat or the force (or delta-V) of the rear-impact collision. Partial insertion or deployment of the insert the first distance into the slot may allow the seatback frame to yield (e.g., pivot) a first amount before limiting, inhibiting, or preventing the seatback frame from yielding towards the rearward seat in the vehicle directly behind the vehicle seat. Insertion or deployment of the insert the second distance into the slot greater than the first distance may limit, inhibit, or prevent the seatback frame from yielding towards the rearward seat in the vehicle directly behind the vehicle seat, or may allow the seatback frame to yield a second amount less than the first amount before inhibiting the seatback frame from deforming towards the rearward seat in the vehicle directly behind the vehicle seat.

In some embodiments of the method 600, the slot includes a wedge-shaped slot and the insert includes a wedge-shaped insert shaped complementary to the wedge-shaped slot. In some embodiments of the method 600, the slot includes a wedge-shaped slot and the insert includes a ball. In some embodiments of the method 600, the frame assembly includes an electromechanical damper.

Acts of the method 600 are for illustrative purposes. For example, the acts of the method 600 may be performed in different orders, split into multiple acts, modified, supplemented, or combined. Any of the acts of the method 600 may include using any of the vehicle seat systems described herein.

Testing

Testing indicated that the systems and methods described herein are effective in limiting, inhibiting, or preventing the seatback frame from yielding towards a rearward seat in the vehicle directly behind the vehicle seat responsive to a rear-impact collision. For example, pull-testing the seatback frame at various exerted forces and the insert deployed into the slot at various distances was compared to the change in the angle of the seatback frame as a result of the exerted forces. The results of the testing indicated that deploying the insert further into the slot decreased the change in angle.

As used herein, the term "about" or "substantially" refers to an allowable variance of the term modified by "about" by +10% or +5%. Further, the terms "less than," "or less," "greater than", "more than," or "or more" include as an endpoint, the value that is modified by the terms "less than," "or less," "greater than," "more than," or "or more."

While various aspects and embodiments have been disclosed herein, other aspects and embodiments are contemplated. The various aspects and embodiment disclosed herein are for purposes of illustration and are not intended to be limiting.

What is claimed is:

1. A vehicle seat system, comprising:

a vehicle seat including a seat bottom frame and a seatback frame secured to the seat bottom frame; and a seatback deformation limiting system including:

a frame assembly configured to selectively allow the seatback frame to yield and also selectively limit or inhibit the seatback frame from yielding; and a computer system including one or more sensors configured to detect a rear-impact collision in a vehicle, wherein the frame assembly is operably coupled to the computer system and, responsive to the computer system detecting the rear-impact collision in the vehicle, configured to limit or inhibit the seatback frame from yielding towards a rearward seat in the vehicle directly behind the vehicle seat, wherein the frame assembly of the seatback deformation limiting system includes:

a detent structure having a first region secured to the seat bottom frame and a second region secured to the seatback frame, the first region and a second region defining a slot therebetween;

an insert sized and dimensioned to fit at least partially within the slot between the first region and the second region of the detent structure; and an actuator secured to the insert and configured to selectively deploy the insert at least partially into the slot, wherein the actuator is operably coupled to the computer system and configured to deploy the insert at least partially into the slot responsive to the computer system detecting the rear-impact collision in the vehicle effective to limit or inhibit the seatback frame from yielding towards the rearward seat in the vehicle directly behind the vehicle seat.

2. The vehicle seat system of claim 1, wherein the frame assembly includes an electromechanical damper.

3. The vehicle seat system of claim 1, wherein the computer system is configured to:

determine if the rearward seat in the vehicle directly behind the vehicle seat is occupied by a rearward occupant;

responsive to the computer system detecting the rear-impact collision in the vehicle, direct the actuator to deploy the insert at least partially into the slot if the rearward seat is occupied by the rearward occupant; and responsive to the computer system detecting the rear-impact collision in the vehicle, direct the actuator not to deploy the insert at least partially into the slot if the rearward seat is not occupied by the rearward occupant.

4. The vehicle seat system of claim 1, wherein:

partial deployment of the insert a first distance into the slot allows the seatback frame to yield a first amount before limiting or inhibiting the seatback frame from yielding towards the rearward seat in the vehicle directly behind the vehicle seat; and deployment of the insert a second distance into the slot greater than the first distance (1) limits or inhibits the seatback frame yielding towards the rearward seat in the vehicle directly behind the vehicle seat or (2) allows the seatback frame to yield a second amount less than the first amount before inhibiting the seatback frame from yielding towards the rearward seat in the vehicle directly behind the vehicle seat.

5. The vehicle seat system of claim 4, wherein the computer system is configured to:

determine at least an approximate weight of a forward occupant sitting in the vehicle seat; and determine whether to deploy the insert into the slot the first distance or the second distance based on at least one of a change of velocity due to the rear-impact collision or at least the approximate weight of the forward occupant.

6. The vehicle seat system of claim 1, wherein the slot includes a wedge-shaped slot and the insert includes a wedge-shaped insert shaped complementary to the wedge-shaped slot.

7. The vehicle seat system of claim 1, wherein the slot includes a wedge-shaped slot and the insert includes a ball.

8. A method of limiting a seatback frame from yielding rearward in a rear-impact collision of a vehicle, the method comprising:

providing a seat back restriction system secured to the seatback frame and a seat bottom frame;

detecting, with one or more sensors of a computer system of the vehicle, a rear-impact collision of the vehicle; and limiting or inhibiting, with the seatback deformation limiting system, the seatback frame from yielding towards a rearward seat in the vehicle directly behind the vehicle seat responsive to direction from the computer system when the one or more sensors detect the rear-impact collision, the seatback deformation limiting system includes:

a detent structure having a first region secured to the seat bottom frame and a second region secured to the seatback frame, the first region and a second region defining a slot therebetween;

an insert sized and dimensioned to fit at least partially within the slot between the first region and the second region of the detent structure; and an actuator secured to the insert and configured to selectively deploy the insert at least partially into the slot;

limiting or inhibiting, with the seatback deformation limiting system, the seatback frame from yielding towards a rearward seat in the vehicle directly behind the vehicle seat includes deploying the insert at least partially into the slot responsive to the computer system detecting the rear-impact collision in the vehicle effective to limit or inhibit the seatback frame from yielding towards the rearward seat in the vehicle directly behind the vehicle seat.

9. The method of claim 8, further comprising:

determining, with the computer system, if the rearward seat in the vehicle directly behind the vehicle seat is occupied by a rearward occupant;

wherein deploying the insert at least partially into the slot responsive to the computer system detecting the rear-impact collision in the vehicle effective to limit or inhibit the seatback frame from yielding towards the rearward seat in the vehicle directly behind the vehicle seat includes:

responsive to the computer system detecting the rear-impact collision in the vehicle, directing the actuator to deploy the insert at least partially into the slot only if the rearward seat is occupied by the rearward occupant.

10. The method of claim 9, further comprising:

determining at least one of an approximate weight of a forward occupant sitting in the vehicle seat or an approximate change in velocity due to the rear-impact collision;

determining whether to deploy the insert into the slot a first distance or a second distance based on at least one of the approximate weight of the forward occupant sitting in the vehicle seat or the change in velocity due to the rear-impact collision;

wherein the seatback frame yields a first amount before being limited or inhibited from yielding towards the rearward seat in the vehicle directly behind the vehicle seat when the insert is deployed the first distance into the slot allows; and wherein the seatback frame (1) is limited or inhibited from yielding towards the rearward seat in the vehicle directly behind the vehicle seat or (2) yields a second amount less than the first amount before being limited or inhibited from yielding towards the rearward seat in the vehicle directly behind the vehicle seat when the insert is deployed the second distance into the slot greater than the first distance.

11. The method of claim 8, wherein the slot includes a wedge-shaped slot and the insert includes a wedge-shaped insert shaped complementary to the wedge-shaped slot.

12. The method of claim 8, wherein the slot includes a wedge-shaped slot and the insert includes a ball.

13. The method of claim 8, wherein the seatback deformation limiting system includes an electromechanical damper.

\* \* \* \* \*